UNITED STATES PATENT OFFICE.

OLIVER H. HICKS, OF BALTIMORE, MARYLAND.

IMPROVEMENT IN MANUFACTURING MATCHES.

Specification forming part of Letters Patent No. 137,840, dated April 15, 1873; application filed March 7, 1873.

*To all whom it may concern:*

Be it known that I, OLIVER H. HICKS, of the city and county of Baltimore, in the State of Maryland, have invented an Improvement in the Manufacture of Matches, of which the following is a specification:

This invention is designed to prevent the absorption of moisture by the commonly-known parlor-match, and thus render it suitable for transportation to or through any climate.

In the ordinary process of manufacturing such matches (in which no sulphur is used) the stick or splint is first dipped in paraffine, mainly to render it more inflammable, and thus to serve, as far as possible, as a substitute for sulphur, which, from its fumes, is very objectionable. This answers the purpose, so far, perfectly well, but experience has shown that it is not, as applied in that manner, any protection against the absorption of moisture and consequent destruction of its utility for the purpose designed, as the head, as well as the splint, will absorb moisture, after which the head may be ignited by friction, and will go out without communicating fire to the splint.

The object of this invention is to produce a match, devoid of all obnoxious fumes, that will bear transportation and retain its essential qualities in any climate. This I accomplish by first putting the head on the splint, and then dipping the headed splint in paraffine or other equivalent. By this process the head is rendered impervious to moisture, the splint rendered inflammable, and the pores of the latter, being sealed at one end, cannot absorb moisture from the atmosphere.

The test to which I have submitted this invention shows that by the immersion of an ordinary parlor-match in water for thirty seconds, and then submitting it to friction, the head will burn, but communicate no fire to the splint; on the other hand, I have submerged matches prepared by my invention for from twelve to eighteen hours, after which they will all ignite and burn the splint as perfectly as if they had never been wetted.

I am aware that water-proof matches have been made by coating them with resinous matter. This I do not consider the equivalent of paraffine, and therefore disclaim it.

What is here claimed as new, and desired to be secured by Letters Patent, is—

A match, constructed substantially as herein described—that is to say, by dipping it in paraffine or other equivalent, after the head or frictional portion has been applied, substantially as and for the purpose specified.

OLIVER H. HICKS.

Witnesses:
W. MORRIS SMITH,
SYDNEY E. SMITH.